US011131539B2

(12) United States Patent
Trenholm et al.

(10) Patent No.: US 11,131,539 B2
(45) Date of Patent: *Sep. 28, 2021

(54) MULTIMODAL IMAGE DATA ACQUISITION SYSTEM AND METHOD

(71) Applicant: SIGHTLINE INNOVATION INC., Toronto (CA)

(72) Inventors: Wallace Trenholm, Toronto (CA); Lorenzo Pons, Toronto (CA)

(73) Assignee: SIGHTLINE INNOVATION INC., Toronto (CA)

( * ) Notice: Subject to any disclaimer, the term of this patent is extended or adjusted under 35 U.S.C. 154(b) by 427 days.

This patent is subject to a terminal disclaimer.

(21) Appl. No.: 16/006,050

(22) Filed: Jun. 12, 2018

(65) Prior Publication Data

US 2019/0137254 A1 May 9, 2019

Related U.S. Application Data

(60) Provisional application No. 62/518,059, filed on Jun. 12, 2017.

(51) Int. Cl.
*G01B 9/02* (2006.01)
*G06T 7/73* (2017.01)
(Continued)

(52) U.S. Cl.
CPC ..... *G01B 9/02087* (2013.01); *G01B 9/02091* (2013.01); *G06N 3/08* (2013.01);
(Continued)

(58) Field of Classification Search
CPC .. G01B 9/02087; G01B 9/02091; G06T 7/73; G06T 7/0004; G06T 2207/30156;
(Continued)

(56) References Cited

U.S. PATENT DOCUMENTS

2007/0263171 A1* 11/2007 Ferguson ........... G01B 9/02091
351/206
2010/0166293 A1* 7/2010 Sugita ................ G01B 9/02085
382/154

(Continued)

*Primary Examiner* — John W Lee
(74) *Attorney, Agent, or Firm* — Bhole IP Law; Anil Bhole; Marc Lampert

(57) ABSTRACT

A system and method for acquiring imaging data of an object. The system includes a beam splitter for directing a derivative sample beam towards the object and a derivative reference beam towards a reflective element; a detector for detecting at least one of the returned reference beam and the returned sample beam; a mode switching module for selecting an operating mode between an optical coherence tomography (OCT) mode and a hyperspectral imaging (HSI) mode; and a computing module for receiving the detection from the detector and the mode from the mode switching module, wherein in the OCT mode, the computing device generates OCT imaging data by determining an interference pattern produced by a superposition of the returned reference beam and the returned sample beam, and wherein in the HSI mode, the computing module generating hyperspectral imaging data by determining hyperspectral information of the returned sample beam.

10 Claims, 4 Drawing Sheets

(51) Int. Cl.
  *G06T 7/00* (2017.01)
  *G06N 3/08* (2006.01)
  *G01J 3/28* (2006.01)

(52) U.S. Cl.
  CPC .............. *G06T 7/0004* (2013.01); *G06T 7/73* (2017.01); *G01J 3/2823* (2013.01); *G01J 2003/2826* (2013.01); *G06T 2207/10036* (2013.01); *G06T 2207/10101* (2013.01); *G06T 2207/20081* (2013.01); *G06T 2207/20084* (2013.01); *G06T 2207/20221* (2013.01); *G06T 2207/30156* (2013.01)

(58) Field of Classification Search
  CPC . G06T 2207/10101; G06T 2207/10036; G06T 2207/20221; G06T 2207/20081; G06T 2207/20084; G06N 3/08; G06N 3/0445; G06N 3/084; G06N 3/0454; G06N 3/0472; G01J 3/2823; G01J 2003/2826
  See application file for complete search history.

(56) References Cited

U.S. PATENT DOCUMENTS

2018/0292198 A1* 10/2018 Manassen .......... G01B 9/02035
2019/0180441 A1* 6/2019 Peng ..................... G06T 7/0016

\* cited by examiner

MULTIMODAL IMAGE DATA ACQUISITION SYSTEM AND METHOD

TECHNICAL FIELD

The present disclosure relates generally to imaging, and more particularly to a multimodal system and method for optical coherence tomography and hyperspectral imaging.

BACKGROUND

As materials in manufacturing, construction, and other industries become increasingly advanced and expensive, new ways of testing and evaluating these materials are being developed, specifically with the goal of leaving the subject material intact. In particular, such testing and evaluation of objects can rely on imaging techniques to evaluate the integrity or reliability of a material, detect defects or irregularities, and otherwise acquire information. Two such imaging techniques include tomographic imaging and spectral imaging. Tomographic imaging involves imaging an object by sections or sectioning through the use of a penetrating wave. Conventionally, tomography can be used for various applications; for example, radiology, biology, materials science, manufacturing, or the like. In particular, optical coherence tomography (OCT) is a tomographic imaging technique that can produce detailed images. Spectral imaging is a branch of spectroscopy in which information from across the electromagnetic spectrum is collected and processed. Spectral imaging has found conventional application in fields such as astronomy, solar physics, planetology, and Earth remote sensing, among others. Hyperspectral imaging (HSI) is one type of spectral imaging that can provide detailed images by obtaining the spectrum for each image pixel in a scene.

Conventionally, tomographic and spectral imaging, and especially OCT and HSI, produce detailed imaging of an object; however, each type of imaging, when used alone, may have limitations on the amount or type of information it can provide about the object.

SUMMARY

In an aspect, there is provided a system for acquiring imaging data of an object, the system comprising: an optical source for producing an originating optical beam; a beam splitter for receiving the originating optical beam, the beam splitter directing a derivative sample beam towards the object and receiving a returned sample beam from the object, the beam splitter further able to direct a derivative reference beam towards a reflective element and receive a returned reference beam from the reflective element; a detector for detecting at least one of the returned reference beam and the returned sample beam; a mode switching module for selecting an operating mode between an optical coherence tomography (OCT) mode and a hyperspectral imaging (HSI) mode; and a computing module for receiving the detection from the detector and the mode from the mode switching module, wherein in the OCT mode, the computing device generates OCT imaging data by determining an interference pattern produced by a superposition of the returned reference beam and the returned sample beam, and wherein in the HSI mode, the computing module generating hyperspectral imaging data by determining hyperspectral information of the returned sample beam.

In a particular case, in the HSI mode, the detector does not receive the returned reference beam.

In another case, the mode switching module comprises an optical switch positioned between the beam splitter and the reflective element, and wherein in the HSI mode, the optical switch prevents the beam splitter from directing the reference beam at the reflective element.

In yet another case, the operating mode is selected by a user.

In yet another case, in the OCT mode, the OCT imaging data comprises A-scan data for a region of the object, and in the HSI mode, the hyperspectral imaging data is received for the same region of the object.

In yet another case, A-scan data and hyperspectral imaging data are both received for successive regions of the object by successively switching between the OCT mode and the HSI mode respectively.

In yet another case, in the OCT mode, the OCT imaging data comprises at least a portion of a B-scan for a region of the object, and in the HSI mode, the hyperspectral imaging data is received for the same region of the object.

In yet another case, at least a portion of B-scan data and hyperspectral imaging data are both received for successive regions of the object by successively switching between the OCT mode and the HSI mode respectively.

In yet another case, the computing module co-registers the OCT imaging data and the hyperspectral imaging data to form an integrated image.

In yet another case, using the OCT imaging data and the hyperspectral imaging data, the computing module detects a feature on a surface or subsurface of the object using a neural network trained using a training set, the training set comprising OCT imaging data and hyperspectral imaging data with a known feature.

In yet another case, the computing module detects a location of the detected feature using the neural network.

In yet another case, the neural network comprises a long short-term memory (LSTM) machine learning approach and a convolutional neural network machine learning approach.

In another aspect, there is provided a method for acquiring imaging data of an object, the method comprising: selecting an operating mode between an optical coherence tomography (OCT) mode and a hyperspectral imaging (HSI) mode; producing an originating optical beam; performing OCT in the OCT mode by: splitting the originating optical beam into a derivative sample beam and a derivative reference beam; directing the sample beam towards the object; receiving a returned sample beam from the object; directing the reference beam towards a reflective element; receiving a returned reference beam from the reflective element; detecting the returned reference beam and the returned sample beam; and generating OCT imaging data by determining an interference pattern produced by a superposition of the returned reference beam and the returned sample beam; and performing HSI in the HSI mode by: directing a sample beam derived from the originating optical beam towards the object; receiving a returned sample beam from the object; detecting the returned sample beam; and generating hyperspectral imaging data by determining hyperspectral information of the returned sample beam.

In a particular case, the operating mode is selected by a user.

In another case, in the OCT mode, the OCT imaging data comprises A-scan data for a region of the object, and in the HSI mode, the hyperspectral imaging data is received for the same region of the object.

In yet another case, A-scan data and hyperspectral imaging data are both received for successive regions of the object by successively switching between the OCT mode and the HSI mode respectively.

In yet another case, in the OCT mode, the OCT imaging data comprises at least a portion of a B-scan for a region of the object, and in the HSI mode, the hyperspectral imaging data is received for the same region of the object.

In yet another case, at least a portion of B-scan data and hyperspectral imaging data are both received for successive regions of the object by successively switching between the OCT mode and the HSI mode respectively.

In yet another case, using the OCT imaging data and the hyperspectral imaging data, detects a feature on a surface or subsurface of the object using a neural network trained using a training set, the training set comprising OCT imaging data and hyperspectral imaging data with a known feature.

In yet another case, the neural network comprises a long short-term memory (LSTM) machine learning approach and a convolutional neural network machine learning approach.

These and other aspects are contemplated and described herein. It will be appreciated that the foregoing summary sets out representative aspects of systems and methods to assist skilled readers in understanding the following detailed description.

BRIEF DESCRIPTION OF THE DRAWINGS

Preferred embodiments of the present disclosure will now be described, by way of example only, with reference to the attached figures, wherein.

DETAILED DESCRIPTION

Figure 1:
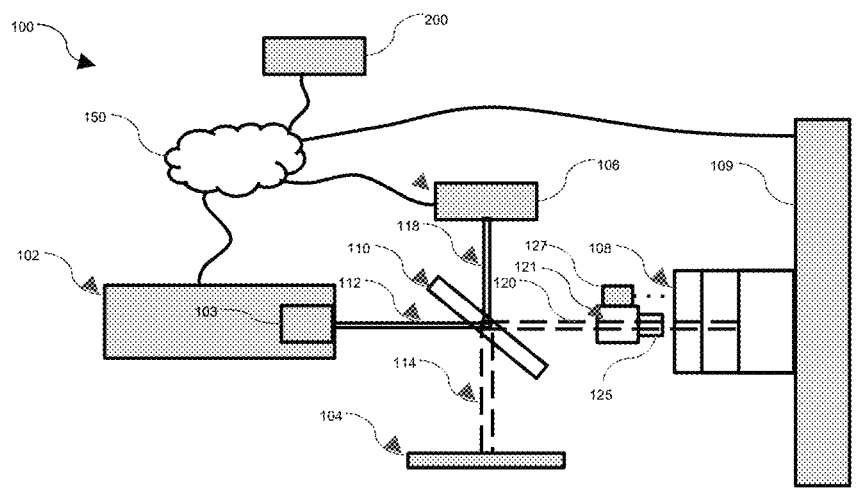
FIG. 1 shows a schematic diagram of an optical coherence tomography and hyperspectral imaging system, in accordance with an embodiment.

Embodiments will now be described with reference to the figures. For simplicity and clarity of illustration, where considered appropriate, reference numerals may be repeated among the Figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, well-known methods, procedures and components have not been described in detail so as not to obscure the embodiments described herein. Also, the description is not to be considered as limiting the scope of the embodiments described herein.

Various terms used throughout the present description may be read and understood as follows, unless the context indicates otherwise: "or" as used throughout is inclusive, as though written "and/or"; singular articles and pronouns as used throughout include their plural forms, and vice versa; similarly, gendered pronouns include their counterpart pronouns so that pronouns should not be understood as limiting anything described herein to use, implementation, performance, etc. by a single gender; "exemplary" should be understood as "illustrative" or "exemplifying" and not necessarily as "preferred" over other embodiments. Further definitions for terms may be set out herein; these may apply to prior and subsequent instances of those terms, as will be understood from a reading of the present description.

Any module, unit, component, server, computer, terminal, engine or device exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of the device or accessible or connectable thereto. Further, unless the context clearly indicates otherwise, any processor or controller set out herein may be implemented as a singular processor or as a plurality of processors. The plurality of processors may be arrayed or distributed, and any processing function referred to herein may be carried out by one or by a plurality of processors, even though a single processor may be exemplified. Any method, application or module herein described may be implemented using computer readable/executable instructions that may be stored or otherwise held by such computer readable media and executed by the one or more processors.

One or more systems or methods described herein may be implemented in computer programs executing on programmable computers, each comprising at least one processor, a data storage system (including volatile and non-volatile memory and/or storage elements), at least one input device, and at least one output device. For example, and without limitation, the programmable computer may be a programmable logic unit, a mainframe computer, server, and personal computer, cloud based program or system, laptop, personal data assistants, cellular telephone, smartphone, or tablet device.

Each program is preferably implemented in a high level procedural or object oriented programming and/or scripting language to communicate with a computer system. However, the programs can be implemented in assembly or machine language, if desired. In any case, the language may be a compiled or interpreted language. Each such computer program is preferably stored on a storage media or a device readable by a general or special purpose programmable computer for configuring and operating the computer when the storage media or device is read by the computer to perform the procedures described herein.

A description of an embodiment with several components in communication with each other does not imply that all such components are required. On the contrary a variety of optional components are described to illustrate the wide variety of possible embodiments of the present disclosure.

Further, although process steps, method steps, algorithms or the like may be described (in the disclosure and/or in the claims) in a sequential order, such processes, methods and algorithms may be configured to work in alternate orders. In other words, any sequence or order of steps that may be described does not necessarily indicate a requirement that the steps be performed in that order. The steps of processes described herein may be performed in any order that is practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article.

The following relates to imaging, and more particularly to a system and method for multimodal imaging and evaluation using optical coherence tomography (OCT) and hyperspectral imaging (HSI).

According to embodiments described herein, an object can be imaged via hyperspectral imaging and optical coherence tomography using a common optical pathway. The object may be first scanned according to an OCT imaging modality, and subsequently by a hyperspectral imaging modality, using the same device. Further, embodiments allow a user to switch between an OCT data acquisition mode and an HSI data acquisition mode; switching between modes may be done manually (e.g. by the user), by the system, or by some combination of both. Embodiments described herein may provide improved surface imaging and evaluation of objects through acquiring, processing, aggregating, or analyzing OCT image data and HSI image data, either independently or in combination. Other analogous applications would be clear to a person of skill in the art and are contemplated herein.

Optical coherence tomography (OCT), and particularly non-destructive OCT, is a technique for imaging in two or three-dimensions. OCT can provide a relatively high resolution, potentially up to few micrometers, and can have relatively deep penetration, potentially up to a few millimeters, in a scattering media.

OCT techniques can use back-scattered light from an object to generate information about that object; for example, generating a three-dimensional representation of that object when different regions of the object are imaged.

Hyperspectral imaging techniques can collect and process information from an object from across the electromagnetic spectrum, with the goal of obtaining the spectrum for each pixel in an image of the object; the recorded spectra can have fine wavelength resolution and cover a wide range of wavelengths. Information obtained through hyperspectral imaging, which may be considered a "spectral signature," can enable identification of materials that make up the scanned object. By scanning an object, hyperspectral imaging systems can collect spectral information from a wide-range of spectrums as one or more 'images'. Each image represents a narrow wavelength range of the electromagnetic spectrum, also known as a spectral band. These 'images' can be combined to form a three-dimensional (x,y,λ) hyperspectral data cube for processing and analysis, where x and y represent two spatial dimensions of the scene, and λ represents a spectral dimension (comprising a range of wavelengths).

FIG. 1 illustrates a schematic diagram of an OCT-HSI system 100, according to an embodiment. The OCT-HSI system 100 can be used to acquire OCT imaging data and/or hyperspectral imaging data. The OCT-HSI system 100 includes a mode switching module for changing the type of image data acquired by the system by selectively allowing or preventing interference between optical beams. The OCT-HSI system 100 includes an optical source 102, a reflective element 104 (for example, a mirror), a beam splitter 110, and a detector 106. The diagram shows an object 108 with three layers of depth. The optical source 102 produces an originating optical beam 112 that is directed towards the beam splitter 110. The beam splitter 110 divides the originating beam 112 and directs one derivative beam 114 towards the reflective element 104 and another derivative beam, referred to herein as the sample beam 120, towards the object to be scanned 108. Both derivative beams 114, 120 are directed back to the beam splitter 110, and then directed as a resultant beam 118 to the detector 106. In some cases, one or more secondary mirrors (not shown) can be provided to reflect the sample beam 120 onto the object 108; particularly in circumstances where the object 108 cannot be physically placed in the line of sight of the sample beam 120 due to physical constraints. In some cases, there may be a scanner head 121 to direct the sample beam 120 onto the object 108. In some cases, the scanner head 121 can include a beam steering device to direct light to the object 108. The beam steering device may be, for example, a mirror galvanometer in one or two dimensions, a single axis scanner, a micro-electromechanical system (MEMs)-based scanning mechanism, a rotating scanner, or other suitable mechanism for beam steering. The beam steering device may be controlled electromechanically. In some embodiments, the scanner head 121 can include a depth-of-field adjusting mechanism 125 for changing the depth of field of the system 100.

In some cases, the OCT-HSI system 100 can include a distance measurement module 127 for determining the distance between the scanner head 121 and the object 108. In an example, the distance measurement module 127 can be an infrared line scanner, laser rangefinder, 3D laser scanner, radar-based rangefinder, or the like. In some cases, the distance measurement module 127 may be associated with, or separate from, the scanner head 121.

In some cases, the system 100 can include an amplification mechanism; for example, a doped fiber amplifier, a semiconductor amplifier, a Raman amplifier, a parametric amplifier, or the like. The amplification mechanism can be used to amplify the signal of the optical source 102 and/or to increase quantity of photons backscattered off the surface under inspection and collected on the detector 106. By using the amplification mechanism, sensitivity of the system 100 may be increased.

In some cases, the system 100 can include an object translator 109 to move the object relative to the sample beam 120 and/or the scanner head 121. The object translator 109 can be, for example, a conveyor system, a robotic system, or the like. The illustration of FIG. 1 is only diagrammatic as the optical paths can be comprised of optical cables, and as such, the system components can have any number of physical placements and arrangements.

While in the present embodiments, the object is described as 'moving' via the object translator 109, it is appreciated that moving can include successively moving and stopping the object 108 for scanning. Additionally, while in the present embodiments, the movement is shown along a single dimensional axis, it is appreciated that the movement of the object can be along a two-dimensional plane.

The optical source 102 may be any light source suitable for use with an interferometric imaging modality; for example, a laser or light emitting diode (LED). Particularly, in some implementations, the optical source 102 can be a tunable laser the wavelength of which can be altered (i.e.

swept) in a controlled manner; for example, to sweep a wide wavelength range (e.g. 110 nm) at high speed (e.g. 20 KHz). In a particular example, the tunable laser can have a centre wavelength of 1310 nm, wherein the wavelength of the emitted light is continuously scanned over a 110 nm range, with a scan rate of 20 kHz and a coherence length of over 10 mm. In a further embodiment, the optical source 102 may be a low coherence light source such as white light or an LED. As an example, using a low coherence light source can facilitate extraction of spectral information from the imaging data by distributing different optical frequencies onto a detector array (e.g. line array CCD) via a dispersive element, such as a prism, grating, or other suitable device. This can occur in a single exposure as information of the full depth scan can be acquired.

In some cases, the optical source 102 can include a collimator 103 for narrowing the originating beam 112. In further cases, further optics may be included in various stages of the system 100 to control or change the optical beams. Optics may include lenses or other optical devices suitable to control, guide, navigate, position, or the like, the light beam in a desired manner; as an example, an F-theta or telecentric lens may be included. Where an F-theta or telecentric lens is used, the planification means that the depth-of-field adjusting mechanism 125 only has to compensate in the axial direction, along the z-axis of the optical beam, as described below.

In further cases, software techniques may be employed for correcting or affecting optical errors or signals.

The detector 106 can be any suitable photodetector. In a particular case, the detector 106 can be a balanced photodetector, which can have an increased signal to noise ratio. In further cases, the detector 106 may be a photoelectric-type photodetector, such as a charge-coupled device (CCD) or complementary metal-oxide semiconductor (CMOS). The detector 106 may operate by photoemission, photovoltaic, thermal, photochemical, or polarization mechanism, or other mechanism through which electromagnetic energy can be converted into an electrical signal. Upon receiving the resultant beam 118, the detector 106 can convert the radiance/intensity of the resultant beam 118 into an electrical signal. In some cases, the electrical signal may then be converted to a digital signal and modified by signal conditioning techniques such as filtering and amplification. In some cases, the interference pattern corresponding to the backscattered light can be converted into a signal by the detector 106 via, for example, a high-speed digitizer.

The OCT-HSI system 100 also includes a computing module 200. The computing module 200 may be locally communicatively linked or remotely communicatively linked, for example via a network 150, to one or more other elements of the system 100; for example, to the optical source 102, the detector 106, the object translator 109, the scanner head 121, the depth-of-field adjusting mechanism 125, the distance measurement module 127, and the mode switching module. The computing module 200 may be used for processing and analysis of imaging data provided by the OCT-HSI system 100. In some cases, the computing module 200 may operate as a control system or controller, and in other cases, may be connected to a separate control system or controller. Further, the computing module 200 may host a user-accessible platform for invoking services, such as reporting and analysis services, and for providing computational resources to effect machine learning techniques on the imaging data.

Figure 2:
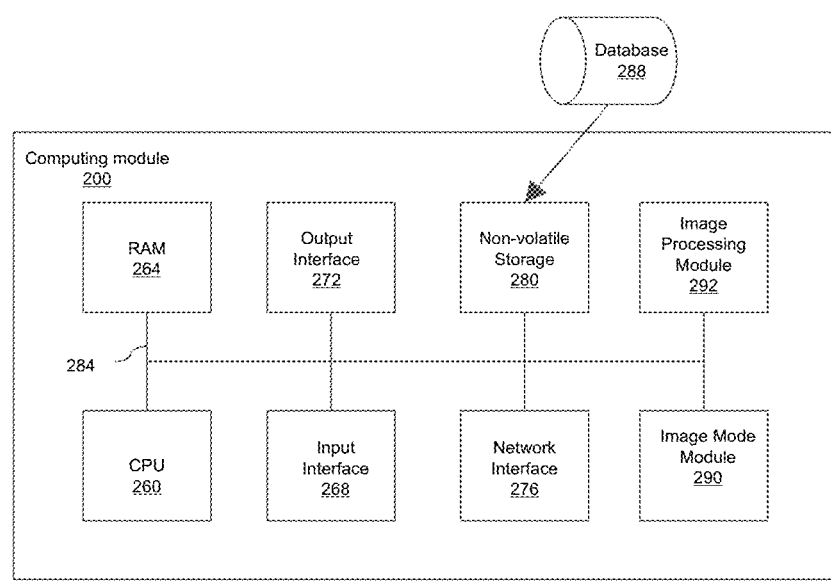
FIG. 2 shows a schematic diagram for a computing module, according to the system of FIG. 1.

In an embodiment, as shown in FIG. 2, the computing module 200 can include a number of physical and logical components, including a central processing unit ("CPU") 260, random access memory ("RAM") 264, an input interface 268, an output interface 272, a network interface 276, non-volatile storage 280, and a local bus 284 enabling CPU 260 to communicate with the other components. CPU 260 can include one or more processors. RAM 264 provides relatively responsive volatile storage to CPU 260. The input interface 268 enables an administrator to provide input via, for example, a keyboard and mouse. The output interface 272 outputs information to output devices, for example, a display or speakers. The network interface 276 permits communication with other systems or computing devices. Non-volatile storage 280 stores the operating system and programs, including computer-executable instructions for implementing the OCT-HSI system 100 or analyzing data from the OCT-HSI system 100, as well as any derivative or related data. In some cases, this data can be stored in a database 288. During operation of the system 200, the operating system, the programs and the data may be retrieved from the non-volatile storage 280 and placed in RAM 264 to facilitate execution. In an embodiment, the CPU 260 can be configured to execute various modules, for example, a mode selection module 290 and an image processing module 292. In further embodiments, the CPU 260 may be configured to execute modules for depth of field adjustment and/or object 108 geometry processing.

In some cases, the system 100 can use machine learning (ML) to transform raw data from the A-scan, B-scan, or C-scan into a descriptor. The descriptor is information associated with a particular defect in the object. The descriptor can then be used to determine a classifier for the defect. As an example, the CPU 260 can do this detection and classification with auto-encoders as part of a deep belief network.

System 100 is capable of acquiring both OCT image data and HSI image data. For example, for a given scan of object 108, the system 100 can acquire an OCT signal and an HSI signal in series, before performing the next scan in a sequence. This may be done at the A-scan or B-scan level. In a particular case, the mode switching module for changing the type of image data acquired by the system 100 can comprise an optical switch. In an embodiment, an optical switch state determines whether the system 100 acquires an OCT signal or a hyperspectral signal. For example, in a first optical switch state, an OCT signal is acquired. The optical switch directs optical radiation from the optical source 102 to the reflective element 104 in addition to the object 108. The resultant beam 118 then comprises the superpositioned reference beam 114 and sample beam 120, and interference within the reference beam 118 is detected. In a second optical switch state, a hyperspectral signal is acquired. The optical switch directs optical radiation from the optical source 102 to the object 108 only. The resultant beam 118 comprises the sample beam 120 (and no reference beam) containing spectral information, and the hyperspectral signal is detected. In some cases, this can be achieved by effectively disabling the reference arm of the system 100, such as by disabling the reflective element 104 in order to prevent backscatter of the reference beam 114. In some embodiments, the mode switching module may be implemented as part of the optical/interferometer setup.

The system 100 can include one or more control lines for controlling the mode switching module. In some cases, the mode switching module may be controlled directly by computing module 200 (without passing through an intermediate) or by a controller within the system 100, which controller may be controlled by software implemented on computing module 200 (such as mode selection module 290). System software may be implemented on computing module 200 and comprise a pre-set scan profile that is loaded or calculated from memory or storage, wherein the software adjusts the state of the mode switching module or optical switch (e.g. active/inactive) during a scan or between scans according to the profile. In a particular embodiment, the optical switch may be positioned between the optical source 102 and the reflective element 104 and can be configured to, when activated, disable the reflective element 104 (or some other component of the reference arm), thereby preventing interference between reference beam 114 and sample beam 120 and producing a hyperspectral signal.

The computing module 200 may further be adapted to process or analyze image data from a scan and output an OCT image, HSI image, or a combined OCT-HSI image. In some embodiments, processing and analysis of image data may include the application of machine learning techniques. Computing module 200 may be communicatively linked to a data acquisition device such as a digitizer, which can be adapted to receive electrical signals from the detector 106. In some cases, the computing module 200 or digitizer is configured to perform a fast Fourier transform (FFT) on the received signals using an FPGA, DSP chip, ASIC, or other digital logic device. In spectral domain OCT (SD-OCT), it may be necessary to perform an FFT prior to forming a tomographic image. Additional signal processing steps (e.g. logarithmic scale compression, digital filtering, and the like) may also be incorporated onto the data acquisition device, to reduce the burden on computing module 200. After data acquisition and FFT processing, OCT and HSI image data may be buffered, re-synchronized, and transmitted by a bus chip to the computing module 200 signal bus 284. The image data can be stored in computing module 200 system memory 280 or database 288 for further processing and conversion to OCT and/or HSI images. OCT and HSI image data can be processed by image processing module 292 to create two-dimensional or three-dimensional OCT or HSI images, or may be coregistered to create an integrated OCT-HSI image.

In some cases, some or all of the computing module 200 can be located in or associated with the scanner head 121; as an example, the mode selection module 290 and/or the image processing module 292 being located in the scanner head 121. In some cases, this can include another CPU 260 and RAM 264 located in the scanner head 121.

OCT systems 100 generally use different localization techniques to obtain information in the axial direction, along the axis of the originating optical beam 112 (z-axis), and obtain information in the transverse direction, along a plane perpendicular to the axis of the originating beam 112 (x-y axes). Information gained from the axial direction can be determined by estimating the time delay of the optical beam reflected from structures or layers associated with the object 108. OCT systems 100 can indirectly measure the time delay of the optical beam using low-coherence interferometry.

Typically, OCT systems that employ low-coherence interferometers can use an optical source 102 that produces an optical beam 112 with a broad optical bandwidth. The originating optical beam 112 coming out of the source 102 can be split by the beam splitter 110 into two derivative beams (or paths). The first derivative beam 114 can be referred to as the reference beam (or arm) and the second derivative beam 120 can be referred to as the sample beam (or arm) of the interferometer. Each derivative beam 114, 120 is reflected back and combined at the detector 106.

The detector 106 can detect an interference effect (fast modulations in intensity) if the time travelled by each derivative beam in the reference arm and sample arm are approximately equal; whereby "equal" generally means a difference of less than a 'coherence length.' Thus, the presence of interference serves as a relative measure of distance travelled by light.

For OCT, the reference arm can be scanned in a controlled manner, and the reference beam 114 can be recorded at the detector 106. An interference pattern can be detected when the mirror 104 is nearly equidistant to one of the reflecting structures or layers associated with the object 108. The detected distance between two locations where the interference occurs corresponds to the optical distance between two reflecting structures or layers of the object in the path of the beam. Advantageously, even though the optical beam can pass through different structures or layers in the object, OCT can be used to separate out the amount of reflections from individual structures or layers in the path of the optical beam.

With respect to obtaining information in the transverse direction, the originating beam 112 can be focused on a small area of the object 108, potentially on the order of a few microns, and scanned over a region of the object.

In another embodiment of an OCT-HSI system, Fourier-domain can be used as a potentially efficient approach for implementation of low-coherence interferometry. Instead of recording intensity at different locations of the reference reflective element 104, intensity can be detected as a function of wavelengths or frequencies of the optical beam 112. In this case, intensity modulations, as a function of frequency, are referred to as spectral interference. Whereby, a rate of variation of intensity over different frequencies can be indicative of a location of the different reflecting structures or layers associated with the object. A Fourier transform of spectral interference information can then be used to provide information similar to information obtained from moving the optical beam, as described above.

In an embodiment of an OCT-HSI system, spectral interference (or spectral signal) can be obtained using either, or both, of spectral-domain technique and swept-source technique. With the spectral-domain technique, the optical beam can be split into different wavelengths and detected by the detector 106 using spectrometry. The resultant beam 118 can be spectrally dispersed using a spectrometer. The spectrometer detects the spectrally dispersed superimposed light and spatially separated light using a positionally resolving detector 106. The positionally resolving detector 106 can provide a spectrum of superimposed light for further processing. In the swept-source technique, the optical beam produced by the optical source 102 can sweep through a range of optical wavelengths, with a temporal output of the detector 106 being converted to spectral interference.

Advantageously, employing Fourier-domain can allow for faster imaging because back reflections from the object can be measured simultaneously.

The resolution of the axial and transverse information can be considered independent. Axial resolution is generally related to the bandwidth, or the coherence-length, of the originating beam 112. In the case of a Gaussian spectrum, the axial resolution ($\Delta z$) can be: $\Delta z = 0.44 * \lambda_0^2 / \Delta \lambda$, where $\lambda_0$ is the central wavelength of the optical beam and $\Delta \lambda$ is the bandwidth defined as full-width-half-maximum of the originating beam. In other cases, for spectrum of arbitrary shape, the axial spread function can be estimated as required.

In some cases, the depth of the topography imaging for an OCT system is typically limited by the depth of penetration of the optical beam into the object 108, and in some cases, by the finite number of pixels and optical resolution of the spectrometer associated with the detector 106. Generally, total length or maximum imaging depth $z_{max}$ is determined by the full spectral bandwidth $\lambda_{full}$ of the spectrometer and is expressed by $z_{max}=(\frac{1}{4}N)*(\lambda_0^2/\lambda_{full})$ where N is the total number of pixels of the spectrometer.

With OCT systems, sensitivity is generally dependent on the distance, and thus delay, of reflection. Sensitivity is generally related to depth by: $R(z)=\sin(p*z)/(p*z)*\exp(-z2/(w*p))$. Where w depends on the optical resolution of spectrometer associated with the detector 106. The first term related to the finite pixels in the spectrometer and the second term related to the finite optical resolution of the spectrometer.

When implementing the OCT-HSI system 100, reflected sample and reference optical beams that are outside of the coherence length will theoretically not interfere. This reflectivity profile, called an A-scan, contains information about the spatial dimensions, layers and location of structures within the object 108. A cross-sectional tomograph, called a B-scan, may be achieved by laterally combining a series of adjacent A-scans of varying axial-depth. A B-scan can be considered a slice of the volume being imaged. One can then further combine a series of adjacent B-scans to form a volume which is called a C-scan. Once an imaging volume has been so composed, a tomograph, or slice, can be computed along any arbitrary plane in the volume.

A-scans represent an intensity profile of the object, and its values (or profile) characterize reflectance of the way the optical beam penetrates the surface of the object. Thus, such scans can be used to characterize the material from the surface of the object to some depth, at an approximately single region of the object 108. As used in the present disclosure, the term 'surface', of an object, is understood to include the peripheral surface down to the depth of penetration of the A-scan. B-scans can be used to provide material characterization from the surface of the object 108 to some depth, across a contour on the surface of the object 108. In this sense, the system 100 can be used to image and perform characterization of the surface of the object 108 according to OCT and HSI imaging modalities.

In some embodiments, the OCT-HSI system 100 can scan the object 108 with reference to surface geometry information. In some cases, the configuration or positioning of one or more OCT-HSI systems 100 (or parts thereof, such as one or more scanner heads 121) can be determined by a geometry module. This may be done by, for example, retrieving the surface geometry of the object 108 from the database 288 or from the input interface 268. As an example, the surface geometry can be derived from a CAD model of the object 108. Upon processing of the object's surface geometry, the geometry module can determine the positioning or configuration of one or more components of the one or more OCT-HSI systems 100 prior to or during a given scan.

Figure 3:
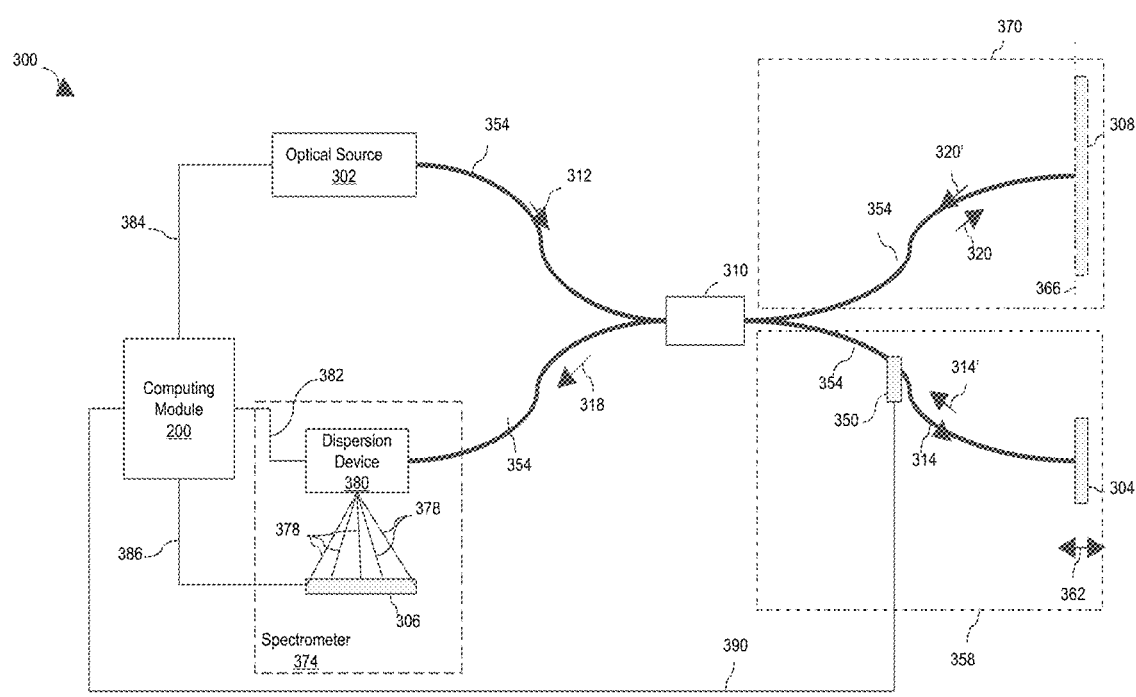
FIG. 3 shows a schematic diagram for an optical coherence tomography (OCT) and hyperspectral imaging system having a spectral domain OCT setup, in accordance with an embodiment.

Referring now to FIG. 3, shown therein is a schematic diagram of an OCT-HSI system 300 comprising a spectral domain OCT (SD-OCT) setup, in accordance with an embodiment. Though not shown, system 300 may include parts or components shown or described in reference to FIG. 1 or FIG. 2. A mode switching module comprising an optical switch 350 is positioned along a reference arm 358 and is configured to selectively allow or prevent the superposition of light in the system 300 and thus acquire an OCT signal or hyperspectral signal. In further embodiments, the optical switch 350 may be positioned elsewhere in the system 300.

System 300 comprises an optical source 302 configured to generate light 312 distributed according to a particular spectrum. Optical source 302 may comprise a superluminescent diode (SLD) adapted to generate light 312 having an adjustable spectral width. Spectral width of the optical source 302 may be adjusted by adjusting electric current supplied to the SLD. In other embodiments, optical source 302 may comprise a white light source for generating light comprising wavelengths in an extended spectral range (e.g. xenon discharge lamp).

Light 312 is guided by optical fiber 354 to a fiber beam splitter/coupler 310. Beam splitter 310 (for example, a fibre coupler) is configured to split light 312 into a reference beam 314 and a sample beam 320. In an exemplary case, the coupling ratio of the fibre coupler 310 is preferably selected to direct a majority of the light to the sample arm (e.g. 90/10) in order to obtain high sensitivity OCT images. Reference beam 314 is guided from fiber coupler 310 via optical fiber 354 down a reference arm 358 to a reflective element 304, where the reference beam 314 is reflected to form returned reference beam 314'. The reflective element 304 may be displaceable in two directions 362 along an x-axis as shown by double arrow to change an optical path of reference beam 314, 314' (i.e. lengthen or shorten). Sample beam 320 is guided via an optical fiber 354 to illuminate an object 308. Sample beam 320 may pass through one or more optical elements along optical fiber 354, which may assist in focusing the sample beam 320 on the object 308. Sample beam 320 may also be directed via a beam scanner to scan the sample beam 320 (e.g. laterally) across the object 308. By scanning the sample beam 320 in this manner, an image comprising structural information about the object 308 can be acquired. Plane 366 denotes a plane up to which sample beam 320 has traveled an optical path having the same optical path length as reference beam 314 (i.e. up to reflective element 304).

Sample beam 320 illuminates and interacts with the object 308 and returns from the object 308 as returned sample beam 320'. Returned sample beam 320' is guided along a sample arm 370 by optical fiber 354 to the beam splitter 310 where it is recombined and superimposed with returned reference beam 314'. Resultant superimposed light beam 318 is formed by superimposing returned reference beam 314' and returned sample beam 320'. The resultant superimposed light beam 318 leaves the fiber coupler 310 and is guided by optical fiber 354 where it enters a spectrometer 374. Spectrometer 374 may comprise a dispersion device 380 for spectrally dispersing the superimposed light 318 into spatially resolved light portions 378. Each light portion 378 comprises electromagnetic light waves having wavelengths within different wavelength ranges. The spatially resolved light portions 378 are detected by detector 306 (e.g. CCD) comprising a plurality of pixels for separately detecting intensities of each of the spatially resolved light portions 378.

The system 300 may be communicatively linked to a computing module 200 for controlling one or more components of the system 300 or processing signals generated by the plurality of pixels of the detector upon detecting intensities of a plurality of spatially resolved light portions 378. The computing module 200 may be connected to and control components of the dispersion device 380 via the control line 382, and the optical source 302 via the control line 384. The intensities of spatially resolved light portions 378 represent a spectrum of detected superimposed light formed by superposition of returned reference and sample beams 314', 320'. The computing module 200 receives the intensities of spatially resolved light portions 378 from the detector 306 via a data transmission line 386, and processes the intensities to derive structural information about the object 308 along an axial direction (i.e. perpendicular to plane 222) of the object 308. Such processing of intensities may include, for example, background subtraction, spectral resampling (e.g. by sampling at equidistant wave numbers), and generating and/or determining a Fourier transformation of the spectrum; the spectrum representing the intensities of the plurality of spectral light and/or spatially resolved spectral light portions 378.

The optical switch 350 can be controlled by computing module 200 via an optical switch control line 390, which transmits a switch signal to optical switch 350, the switch signal corresponding to a switch state. When received, the switch signal causes the optical switch 350 to assume the corresponding switch state. In an embodiment, there are two switch states: a first switch state, corresponding to an OCT data acquisition mode, and a second switch state, corresponding to an HSI data acquisition mode. The switch state determines, in effect, whether the reference arm 358 of system 300 is enabled (i.e. operative) or disabled (i.e. inoperative).

Optical switch 350 is configured to, when in the second switch state (or HSI mode), prevent the superpositioning of the returned reference beam 314' with the returned sample beam 320', and may take any suitable form for achieving such function. For example, the optical switch 350 can operate by mechanical means, such as by physically shifting a component optical fiber to drive one or more alternative optical fibers. Alternatively, the optical switch can utilize electro-optical effects, magneto-optical effects, and the like. Such techniques may be used to perform logic operations. Optical switch 350 can implement a MEMs-based device comprising an array of mirrors for deflecting the incoming optical signal to an appropriate receiver (such as to the reference arm 358 and sample 370 arm, or sample arm 370 only). Other embodiments may have optical switch 350 implement piezoelectric beam steering, such as with piezoelectric ceramics providing enhanced optical switching characteristics. In yet further embodiments, the optical switch 350 may implement one or more of the following: an inkjet method, liquid crystals, a thermal method (e.g. varying the refractive index), a nonlinear method, an acousto-optic method (e.g. changing the refractive index as a result of a strain induced by an acoustic field to deflect light), amplifiers or alternators.

In the present embodiment, the optical switch 350 is positioned between the optical source 302 and the reflective element 304 such that, when the optical switch 350 is in the second switch state, the reflective element 304 is disabled and the light guided via optical fiber 354 to spectrometer 374 comprises only the returned sample beam 320'. Hyperspectral imaging signals in the sample beam 320 can be sent from the detector 306 to the computing module 200 via data transmission line 386 and processed according to hyperspectral data processing techniques; such techniques may include, for example, calibration, data cube creation, spectral and spatial preprocessing, dimensionality reduction (e.g. feature extraction and selection), or the like.

In an embodiment, the mode selection module 290 can direct the system 300 to acquire OCT image data for a given A-scan, direct the optical switch 350 to change acquisition modes, direct the system 300 to acquire HSI image data for the same A-scan location, and then direct the system 300 to perform the next A-scan of the object 308. In some cases, the system 300 can be configured to complete a B-scan of the object 308 in OCT data acquisition mode, activate the optical switch 350, and complete a B-scan of the object 308 in HSI data acquisition mode. In such cases, changes to the optical switch 350 can be synchronized with the time between the performance of scans by the system 300.

Figure 4:
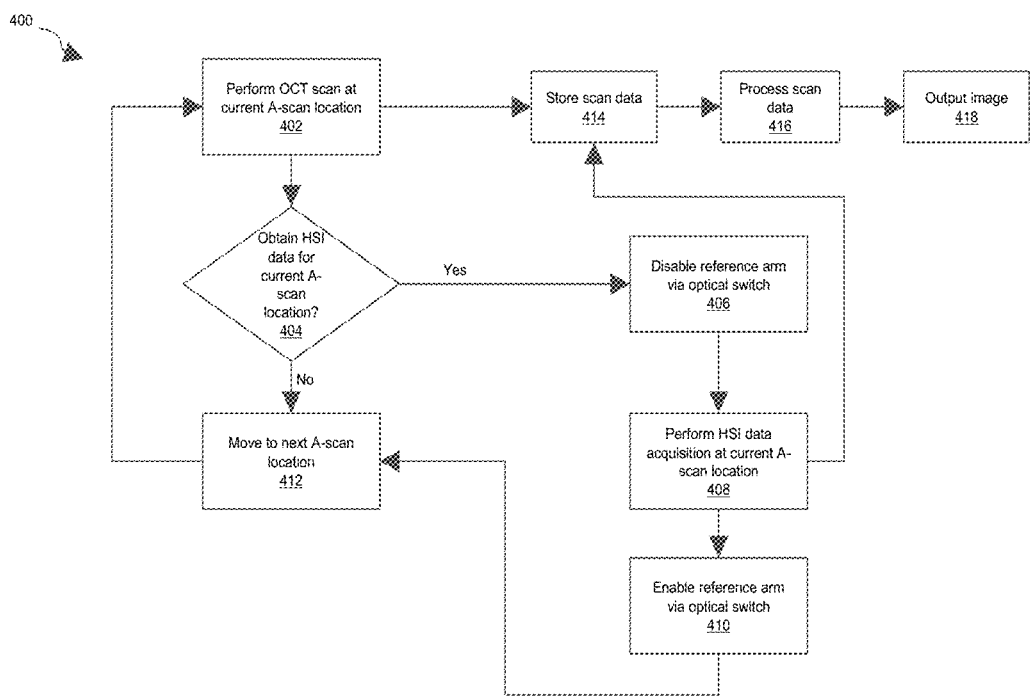
FIG. 4 shows a flowchart of a method for imaging an object using optical coherence tomography (OCT) and hyperspectral imaging (HSI), in accordance with an embodiment.

Referring now to FIG. 4, shown therein is a method 400 of surface inspection using the OCT-HSI system 300, in accordance with an embodiment. The method 400 may be used for inspecting the surface of an object 308. In an exemplary case, the method 400 can be used for the purposes of detecting surface defects or irregularities.

At block 402, the system 300, having assumed a first (current) A-scan position, performs an OCT scan at the current A-scan location on the surface of the object 308. OCT scan data corresponding to the current A-scan location can be stored by computing module at block 418. Such scan data may include indexing data such as time and location information for the given scan. While method 400 describes the storage of scan data, the scan data need not be stored and may, in some cases, be sent to computing module 200 for processing without first being stored.

At block 404, the mode selection module 290 determines whether the object 308 is to be scanned in HSI mode for the current A-scan location on the object 308.

At block 406, if HSI data is to be acquired for the current A-scan location, the CPU 260 directs the optical switch 350 to disable the reference arm 358 of system 300.

At block 408, the system 300 acquires HSI data for the current A-scan location. Having disabled the reference arm 358, the resultant beam 318 received by the detector 306 includes only the returned sample beam 320' comprising a hyperspectral signal from the object 308 for the given A-scan location. Acquired HSI scan data can be stored by the computing module 200 at block 414. HSI scan data may include indexing data such as time and location information for the given scan.

At block 410, the CPU 260 directs the optical switch 350 to enable the reference arm 358 of system 300. At block 412, the CPU 260 directs the system 300 (e.g. via a scanner head 121) to move to the next A-scan location for object 308.

If at block 404 the mode selection module 290 determines that HSI data is not to be acquired from the current A-scan location, at block 412 the CPU 260 directs the system 300 to assume a subsequent A-scan location on the object 308.

Once the system 300 has assumed the subsequent A-scan location at block 412, such subsequent A-scan location can then be considered the now-current A-scan location, and steps 402 to 418 can be repeated for the next A-scan in the sequence.

The system 300 can repeat steps 402 to 418, as the system assumes successive positions over time as the object moves relative to the scanner head 121; for example, moved via a motion control mechanism. Beam steering, optical delay, and focus adjustment can be adjusted as necessary throughout various steps of method 400.

In an alternate embodiment, the steps of method 400 can be performed at the B-scan level instead of the A-scan level; for example, the system 300 performs a B-scan in OCT mode before determining whether to acquire HSI data for the given B-scan. In some cases, the system 300 may be configured to acquire OCT or HSI data for only a portion of a B-scan.

At block 416, acquired OCT and HSI data can be processed; for example, image processing module 292 can implement OCT and HSI image processing techniques. Successive A-scans or B-scans, whether comprising OCT data, HSI data, or both, can be aggregated by the image processing module 292. The aggregation technique may involve stacking images comprising the imaging data according to image processing techniques. In an embodiment, aggregation of imaging data may include the formation of a B-scan from a plurality of A-scans. In some cases, the B-scan and/or A-scans are presented to a user via output interface 272. Further, in some embodiments, processing of HSI and OCT data may include co-registering the data to form an integrated image or analysis of the OCT and/or HSI data for defects or irregularities via machine learning techniques. At block 418, the output of the image processing and analysis can be presented to the user via output interface 272.

In some cases, after the A-scans, B-scans, and/or C-scans (comprising OCT data, HSI data, or both) have been determined, the system can detect whether there are defects in the object using image interpretation and machine learning techniques. The defective label indicates that an unacceptable defect has been detected, and in some cases, such defect is of a particular type. In the example where the object is a vehicle part, the defect may have different shapes and dimensions. As an example, the defect may be an unwanted round seed or crater, or the like, on or under the surface of the part. As another example, the defect may have an elongated shape, such as with an unwanted fiber, or the like, on or under the surface of the part. As an example, the acceptable/defective label may be with regards to the size, area, or volume of a defect. In another example, acceptable/defective label may be with regards to the presence of defect between different layers of films applied in an industrial process; for example, in an automotive setting, in an electro-deposition (ED) layer, a colour layer, or a clear layer, where each layer is in the order of tens of microns thick.

In some cases, based on analysis of the OCT or HSI images, the system 100 can provide further information in the form of feature localization on the object. As an example, the information may be that there is fiber defect at location x=3.4 cm, y=5.6 cm on a vehicle part. Feature localization can also be specified with respect to surface depth, along the z-axis. Depth localization can be particularly advantageous in certain applications; for example, when thin films are being applied to a vehicle part. In this case, for example, after a vehicle part is painted, paint inspection may be required on various layers including an electro-deposition layer, a colour layer, and a clear coat layer. Being able to detect and determine the presence of a defect between any two of these layers is particularly advantageous because it has implications on the amount of re-work that may be required to resolve the imperfection. It can also be advantageous for improvement to a manufacturing process by being able to determine what type of defect is located at what layer; for example, a faulty HVAC system in the manufacturing environment could be responsible for introducing defects between layers. In this regard, being able to localize defect origin to a portion of the manufacturing path is an advantage to reduce future defects and rework.

The machine-learning based analysis of the computing module 200 may be implemented by providing input data to the neural network, such as a feed-forward neural network, for generating at least one output. The neural networks described herein may have a plurality of processing nodes, including a multi-variable input layer having a plurality of input nodes, at least one hidden layer of nodes, and an output layer having at least one output node. During operation of a neural network, each of the nodes in the hidden layer applies a function and a weight to any input arriving at that node (from the input layer or from another layer of the hidden layer), and the node may provide an output to other nodes (of the hidden layer or to the output layer). The neural network may be configured to perform a regression analysis providing a continuous output, or a classification analysis to classify data. The neural networks may be trained using supervised or unsupervised learning techniques. According to a supervised learning technique, a training dataset is provided at the input layer in conjunction with a set of known output values at the output layer; for example, imaging data for which defect location and/or existence is known. During a training stage, the neural network may process the training dataset. It is intended that the neural network learn how to provide an output for new input data by generalizing the information it learns in the training stage from the training data. Training may be effected by back-propagating error to determine weights of the nodes of the hidden layers to minimize the error. The training dataset, and the other data described herein, can be stored in the database 288 or otherwise accessible to the computing module 200. Once trained, or optionally during training, test data can be provided to the neural network to provide an output. A neural network may thus cross-correlate inputs provided to the input layer in order to provide at least one output at the output layer. Preferably, the output provided by a neural network in each embodiment will be close to a desired output for a given input, such that the neural network satisfactorily processes the input data.

In embodiments described herein, the computing module 200 can perform the detection by employing, at least in part, a long short-term memory (LSTM) machine learning approach. The LSTM neural network allows the computing module 200 to quickly and efficiently perform group feature selections and classifications.

In embodiments described herein, the computing module 200 can perform the detection by employing, at least in part, a convolutional neural network (CNN) machine learning approach.

While computing module 200 is described as using certain machine-learning approaches, specifically LSTM and CNN, it is appreciated that, in some cases, other suitable machine learning approaches may be used where appropriate.

The embodiments described herein include various intended advantages. As an example, the embodiments described herein use a common optical path for generating OCT and HSI image data, limiting the number of components, expense, and complexity of imaging tasks while acquiring both types of image data.

The above described embodiments of the present disclosure are intended to be examples of the present disclosure and alterations and modifications may be effected thereto, by those of skill in the art, without departing from the scope of the present disclosure, which is defined solely by the claims appended hereto. For example, systems, methods, and embodiments discussed can be varied and combined, in full or in part.

Thus, specific imaging systems and methods have been disclosed. It should be apparent, however, to those skilled in the art that many more modifications besides those already described are possible without departing from the inventive concepts herein. The subject matter of the present disclosure, therefore, is not to be restricted except in the spirit of the disclosure. Moreover, in interpreting the present disclosure, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

The invention claimed is:

1. A system for acquiring imaging data of an object, the system comprising:
   an optical source for producing an originating optical beam;
   a beam splitter for receiving the originating optical beam, the beam splitter directing a derivative sample beam towards the object and receiving a returned sample beam from the object, the beam splitter further able to direct a derivative reference beam towards a reflective element and receive a returned reference beam from the reflective element;
   a detector for detecting at least one of the returned reference beam and the returned sample beam;
   a mode switching module for selecting an operating mode between an optical coherence tomography (OCT) mode and a hyperspectral imaging (HSI) mode, the mode switching module comprises an optical switch positioned between the beam splitter and the reflective element, and wherein in the HSI mode, the optical switch prevents the beam splitter from directing the reference beam at the reflective element; and
   a computing module for receiving the detection from the detector and the mode from the mode switching module, wherein in the OCT mode, the computing device generates OCT imaging data by determining an interference pattern produced by a superposition of the returned reference beam and the returned sample beam, and wherein in the HSI mode, the computing module generating hyperspectral imaging data by determining hyperspectral information of the returned sample beam.

2. The system of claim 1, wherein the operating mode is selected by a user.

3. The system of claim 1, wherein in the OCT mode, the OCT imaging data comprises A-scan data for a region of the object, and in the HSI mode, the hyperspectral imaging data is received for the same region of the object.

4. The system of claim 3, wherein A-scan data and hyperspectral imaging data are both received for successive regions of the object by successively switching between the OCT mode and the HSI mode respectively.

5. The system of claim 1, wherein in the OCT mode, the OCT imaging data comprises at least a portion of a B-scan for a region of the object, and in the HSI mode, the hyperspectral imaging data is received for the same region of the object.

6. The system of claim 5, wherein at least a portion of B-scan data and hyperspectral imaging data are both received for successive regions of the object by successively switching between the OCT mode and the HSI mode respectively.

7. The system of claim 1, wherein the computing module co-registers the OCT imaging data and the hyperspectral imaging data to form an integrated image.

8. The system of claim 1, wherein, using the OCT imaging data and the hyperspectral imaging data, the computing module detects a feature on a surface or subsurface of the object using a neural network trained using a training set, the training set comprising OCT imaging data and hyperspectral imaging data with a known feature.

9. The system of claim 8, wherein the computing module detects a location of the detected feature using the neural network.

10. The system of claim 8, wherein the neural network comprises a long short-term memory (LSTM) machine learning approach and a convolutional neural network machine learning approach.

* * * * *